United States Patent
Takashima et al.

(10) Patent No.: US 11,739,204 B2
(45) Date of Patent: Aug. 29, 2023

(54) POLYMER COMPOSITE MATERIAL

(71) Applicant: Osaka University, Suita (JP)

(72) Inventors: Yoshinori Takashima, Suita (JP); Akira Harada, Suita (JP); Motofumi Osaki, Suita (JP); Kensaku Takahashi, Suita (JP); Junsu Park, Suita (JP)

(73) Assignee: Osaka University, Suita (JP)

( * ) Notice: Subject to any disclaimer, the term of this patent is extended or adjusted under 35 U.S.C. 154(b) by 113 days.

(21) Appl. No.: 17/325,471

(22) Filed: May 20, 2021

(65) Prior Publication Data

US 2021/0363338 A1   Nov. 25, 2021

(30) Foreign Application Priority Data

May 21, 2020   (JP) .................. 2020-089200

(51) Int. Cl.
  *C08L 25/06*    (2006.01)
  *C08L 5/16*    (2006.01)
(52) U.S. Cl.
  CPC .............. *C08L 25/06* (2013.01); *C08L 5/16* (2013.01)

(58) Field of Classification Search
  CPC ................................. C08L 25/06; C08L 5/16
  See application file for complete search history.

(56) References Cited

U.S. PATENT DOCUMENTS

2018/0133986 A1    5/2018  Harada et al.

FOREIGN PATENT DOCUMENTS

| EP | 3590972 A1 | | 1/2020 |
|---|---|---|---|
| JP | 2014223043 A | * | 12/2014 |
| WO | 2016/163550 A1 | | 10/2016 |
| WO | 2018/159791 A1 | | 9/2018 |

* cited by examiner

*Primary Examiner* — Robert D Harlan
(74) *Attorney, Agent, or Firm* — Locke Lord LLP

(57) ABSTRACT

An object is to provide a macromolecular composite material that can be produced by a simple process, and that has excellent mechanical properties. The macromolecular composite material of the present invention contains a polymer component and a cyclodextrin compound, the polymer component containing a thermoplastic resin, and the cyclodextrin compound being at least one member selected from the group consisting of cyclodextrin and cyclodextrin derivatives. The macromolecular composite material of the present invention can be produced by a simple process, and has excellent mechanical properties.

10 Claims, 2 Drawing Sheets

POLYMER COMPOSITE MATERIAL

TECHNICAL FIELD

The present invention relates to a macromolecular composite material.

BACKGROUND ART

Macromolecular materials are widely applied to, for example, films, adhesives, coating agents, molding materials, paints, etc., and are functional materials that are indispensable in the fields of electronic components, automotive parts, packaging materials, etc. In particular, in recent years, there has been a demand for higher performance and higher-precision products in various fields. Therefore, higher performance and higher functionality are required of macromolecular materials, and the research and development of various new macromolecular materials is actively carried out.

As a means for improving the performance of macromolecular materials, a method comprising mixing a base macromolecular compound with additives, such as an inorganic filler or a rubber component, to form a macromolecular composite material is generally known. Further, for example, Patent Literature (PTL) 1 or Patent Literature (PTL) 2 proposes a technique for precise control of a macromolecular structure using host-guest interactions by a clathrate complex, in order to provide a macromolecular material with high mechanical strength etc.

CITATION LIST

Patent Literature

PTL 1: WO2016/163550
PTL 2: WO2018/159791

SUMMARY OF INVENTION

Technical Problem

However, in methods for precisely controlling a macromolecular structure, the step of producing a macromolecular composite material is often complicated. Further, mass-production of a macromolecular composite material is difficult at present. Therefore, establishing an efficient process for producing a macromolecular composite material is said to be still a long way off. From this point of view, it is considered valuable in industry to provide a macromolecular composite material that can be produced by a simple process. In particular, there is a strong demand in various fields for a macromolecular composite material with excellent mechanical properties. Accordingly, there is an urgent need to provide such a macromolecular composite material by a convenient method.

The present invention was made in consideration of the above. An object of the present invention is to provide a macromolecular composite material that can be produced by a simple process, and that has excellent mechanical properties.

Solution to Problem

As a result of extensive research to achieve the above object, the present inventors found that the above object can be achieved by forming a composite by using a specific polymer component and a cyclodextrin compound. The present inventors have thereby accomplished the present invention.

More specifically, the present invention includes, for example, the subject matter according to the following items.

Item 1
A macromolecular composite material comprising a polymer component and a cyclodextrin compound, the polymer component containing a thermoplastic resin, and the cyclodextrin compound being at least one member selected from the group consisting of cyclodextrin and cyclodextrin derivatives.

Item 2
The macromolecular composite material according to Item 1, wherein the thermoplastic resin is at least one member selected from the group consisting of vinyl polymers and polyesters.

Item 3
The macromolecular composite material according to Item 2, wherein the vinyl polymer is at least one member selected from the group consisting of polystyrene resins and polyacrylic resins.

Item 4
The macromolecular composite material according to Item 2 or 3, wherein the polyester is a polylactic acid.

Item 5
The macromolecular composite material according to any one of claims 1 to 4, wherein the cyclodextrin derivative has a structure in which at least one hydrogen atom of hydroxyl groups of the cyclodextrin is replaced by at least one substituent selected from the group consisting of hydrocarbon groups, acyl groups, and —CONHR (wherein R is an alkyl group).

Item 6
The macromolecular composite material according to any one of Items 1 to 5, wherein the proportion of the polymer component is 50 mass % or more, based on the total mass of the polymer component and the cyclodextrin compound.

Item 7
The macromolecular composite material according to any one of Items 1 to 6, which has a sea-island structure.

Advantageous Effects of Invention

The macromolecular composite material can be produced by a simple process, and has excellent mechanical properties.

DESCRIPTION OF EMBODIMENTS

Figure 1:
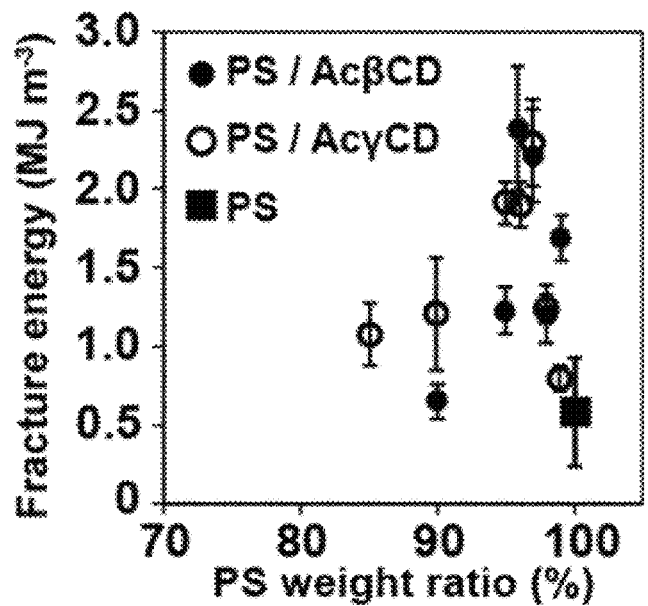
FIG. 1(a) and FIG. 1(b) show evaluation results of mechanical properties of the samples obtained in Examples and Comparative Example.
Figure 1:
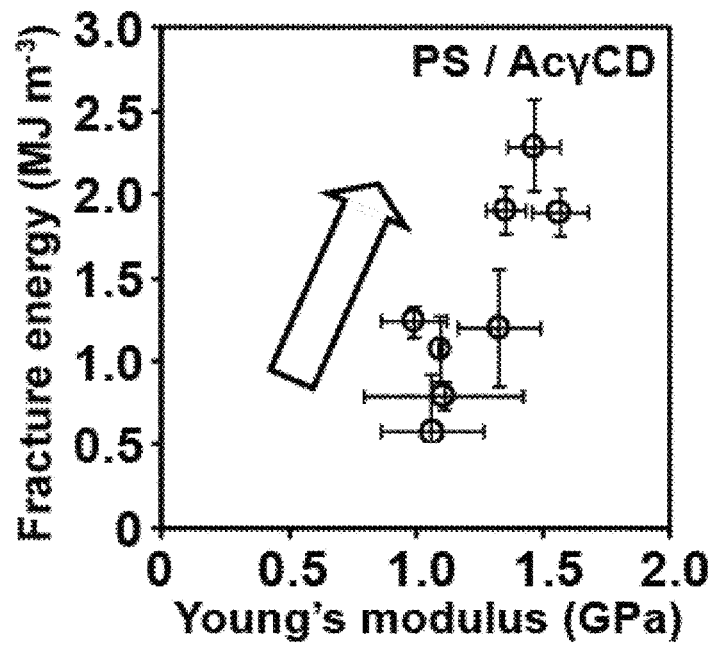

Embodiments of the present invention are described below in detail. In the present specification, the terms "comprise" and "contain" include the concepts of comprising, containing, substantially consisting of, and consisting of.

The macromolecular composite material of the present invention contains a polymer component and a cyclodextrin compound. In particular, the polymer component contains a thermoplastic resin, and the cyclodextrin compound is at least one member selected from the group consisting of cyclodextrin and cyclodextrin derivatives. This macromolecular composite material can be produced by a simple process, and has excellent mechanical properties.

Polymer Components

The polymer component is a material used as a main component of the macromolecular composite material, and is a so-called matrix component of the macromolecular composite material. As described above, the polymer component comprises a thermoplastic resin.

The thermoplastic resin is not particularly limited, and a wide range of known thermoplastic resins can be used. Examples of the thermoplastic resin include a wide variety of vinyl polymers and various other resins, such as polyesters, polyamides, polyacetals, polyphenylene oxides, and polyimides.

In view of easily obtaining a macromolecular composite material with excellent mechanical properties, and easily forming a sea-island structure as described below, the thermoplastic resin is preferably at least one member selected from the group consisting of vinyl polymers and polyesters.

The vinyl polymer is not particularly limited, and a wide range of known thermoplastic vinyl polymers can be used. Examples of vinyl polymers include polystyrene resins, polyacrylic resins, polyolefin resins, ABS resins, polyvinyl chloride, and the like. Examples of polystyrene resins include polystyrene, and resins in which the styrene unit is styrene or is not styrene, including polystyrene derivatives such as α-methylstyrene, trimethylstyrene, 4-methoxystyrene, and 4-chlorostyrene. Examples of polyacrylic resins include polymethyl (meth)acrylate and the like. Examples of polyolefin resins include polyethylene, polypropylene, and the like.

In the present specification, "(meth)acrylic" refers to "acrylic" or "methacrylic"; "(meth)acrylate" refers to "acrylate" or "methacrylate"; and "(meth)allyl" refers to "allyl" or "methallyl."

The vinyl polymer is particularly preferably at least one member selected from the group consisting of polystyrene resins and polyacrylic resins. In this case, the macromolecular composite material can easily form a sea-island structure, as described below. As a result, the macromolecular composite material can easily have enhanced mechanical properties, and can also be easily produced.

The polyester is also not particularly limited, and a wide range of known thermoplastic polyester resins can be used. Examples of polyester resins include a wide range of resins having an ester bond in the main chain, such as polylactic acid, polyethylene terephthalate, and polybutylene terephthalate. Among them, the polyester is preferably a polylactic acid because it is biodegradable, and the obtained macromolecular composite material can easily have enhanced mechanical properties.

The thermoplastic resin contained in the polymer component is preferably at least one member selected from the group consisting of polystyrene resins, polyacrylic resins, and polylactic acids; more preferably at least one member selected from the group consisting of polystyrene resins and polyacrylic resins; and particularly preferably a polystyrene resin.

The thermoplastic resin can be a homopolymer or a copolymer. When the thermoplastic resin of the present invention is a copolymer, the copolymer can be a random copolymer, a block copolymer, or an alternating copolymer.

The thermoplastic resin can have a linear chain structure, a branched structure, or a cross-linked structure.

The thermoplastic resin contained in the polymer component can consist of only one type of thermoplastic resin, or can contain two or more different types of thermoplastic resins.

The weight average molecular weight (Mw) of the thermoplastic resin is not limited. Accordingly, the thermoplastic resin can be a low-molecular-weight polymer (i.e., a so-called oligomer), or an ultra-high-molecular-weight polymer. For example, the weight average molecular weight (Mw) of the thermoplastic resin can be 50,000 to 1,000,000, and preferably 100,000 to 500,000. The weight average molecular weight (Mw) referred to herein is a polystyrene-equivalent value as measured by gel permeation chromatography (GPC). For example, when the weight average molecular weight (Mw) of a thermoplastic resin is guaranteed or measured by the manufacturer and the guaranteed or measured value is known, the known weight average molecular weight value can be used as the weight average molecular weight (Mw) of the thermoplastic resin.

The method for producing the thermoplastic resin is not particularly limited, and the same production methods as those for known thermoplastic resins can be widely used. Thermoplastic resins are also available from commercial products and the like. The thermoplastic resin may contain, for example, various known additives. Examples of such additives include light stabilizers, antioxidants, preservatives, surfactants, fillers such as inorganic particles, flame retardants, pigments, colorants, fungicides, lubricants, and the like.

The polymer component may include macromolecular compounds other than thermoplastic resins, as long as the effect of the invention is not impaired. When the polymer component contains other polymer compounds, the proportion thereof can be, for example, 5 mass % or less, preferably 1 mass % or less, more preferably 0.1 mass % or less, and particularly preferably 0.05 mass % or less, relative to the mass of the thermoplastic resin. The polymer component can consist solely of the thermoplastic resin.

Cyclodextrin Compound

The cyclodextrin compound is at least one member selected from the group consisting of cyclodextrin and cyclodextrin derivatives.

Examples of the cyclodextrin include α-cyclodextrin, cyclodextrin, γ-cyclodextrin, and the like.

Just to note, the term "cyclodextrin" used herein refers to at least one member selected from the group consisting of α-cyclodextrin, β-cyclodextrin, and γ-cyclodextrin. Similarly, the term "cyclodextrin derivative" or "cyclodextrin derivatives" refers to at least one member selected from the group consisting of α-cyclodextrin derivatives, β-cyclodextrin derivatives, and γ-cyclodextrin derivatives.

The cyclodextrin derivative refers to, for example, a compound wherein at least one hydrogen atom of hydroxyl groups of cyclodextrin is replaced by one or more other substituents (hereinafter simply referred to as "substituents"). Examples of substituents include, but are not limited to, a wide variety of monovalent groups that can replace hydrogen atoms of hydroxyl groups of cyclodextrin. Such substituents are preferably hydrophobic groups. Specific examples include hydrocarbon groups, acyl groups, and —CONHR (wherein R is an alkyl group).

The cyclodextrin derivative preferably has a structure in which at least one hydrogen atom of hydroxyl groups of the cyclodextrin is replaced by at least one group selected from the group consisting of hydrocarbon groups, acyl groups, and —CONHR (wherein R is an alkyl group). In this case, the obtained macromolecular composite material can easily have enhanced mechanical properties. In particular, when the macromolecular composite material contains a polystyrene resin as a polymer component, particularly excellent mechanical properties can be obtained.

Examples of hydrocarbon groups include, but are not limited to, alkyl groups, alkenyl groups, and alkynyl groups. The number of carbon atoms of the hydrocarbon group is not particularly limited; however, it is preferably, for example, 1 to 4. Specific examples of hydrocarbon groups having 1 to 4 carbon atoms include methyl, ethyl, propyl, and butyl. When the hydrocarbon group is propyl or butyl, the hydrocarbon group can be linear or branched.

Examples of acyl groups include, but are not limited to, acetyl, propionyl, formyl, and the like. The acyl group is preferably acetyl.

—CONHR (wherein R is methyl or ethyl) can be, for example, a methyl carbamate group or an ethyl carbamate group. —CONHR is preferably an ethyl carbamate group.

The cyclodextrin derivative preferably has a structure such that the hydrogen atoms of at least 70%, more preferably 80% or more, and even more preferably 90% or more, of all hydroxyl groups that are present in the molecule of the cyclodextrin derivative are replaced by the above substituents; and particularly preferably, the cyclodextrin derivative has a structure such that the hydrogen atoms of all hydroxyl groups of cyclodextrin are replaced by the above substituents.

In terms of easily enhancing the mechanical properties of the macromolecular composite material, the cyclodextrin compound is preferably a cyclodextrin derivative, and particularly preferably a cyclodextrin derivative in which the substituent is an alkyl group having 1 to 4 carbons or an acetyl group. In this case, the cyclodextrin derivative is more preferably a β-cyclodextrin derivative and/or a γ-cyclodextrin derivative, and particularly preferably a γ-cyclodextrin derivative.

In the macromolecular composite material, when the thermoplastic resin contained in the polymer component of the macromolecular composite material is either a polystyrene resin or a polyacrylic resin, the cyclodextrin compound is preferably an α-cyclodextrin derivative, a β-cyclodextrin derivative, or a γ-cyclodextrin derivative; more preferably a β-cyclodextrin derivative or a γ-cyclodextrin derivative; and particularly preferably a γ-cyclodextrin derivative, because the obtained macromolecular composite material can easily have enhanced mechanical properties. In these cases, the substituent in the cyclodextrin derivative is preferably an alkyl group having 1 to 4 carbon atoms, or an acetyl group.

In the macromolecular composite material, when the thermoplastic resin contained in the polymer component is a polylactic acid, the cyclodextrin compound is preferably α-cyclodextrin or an α-cyclodextrin derivative; β-cyclodextrin or a β-cyclodextrin derivative; or γ-cyclodextrin or a γ-cyclodextrin derivative, because the obtained macromolecular composite material can easily have enhanced mechanical properties. In these cases, the substituent in the cyclodextrin derivative is preferably an alkyl group having 1 to 4 carbon atoms (in particular, methyl), or acetyl.

The macromolecular composite material can contain only one cyclodextrin compound, or a combination of two or more different cyclodextrin compounds.

The cyclodextrin compound can be produced by a known method, or is also available from a commercially available product. When the cyclodextrin compound is a cyclodextrin derivative, the cyclodextrin derivative can be produced, for example, by a known method using cyclodextrin as a starting material (see, for example, Patent Literature (PTL) 2).

For example, as a method for replacing hydrogen atoms of hydroxyl groups present in cyclodextrin by hydrocarbon groups includes, a wide variety of known alkylation reactions can be used. As a method for replacing hydrogen atoms of hydroxyl groups present in cyclodextrin by acyl groups, such as acetyl groups, includes, a wide variety of known acylation reactions can be used. Another example of replacing hydrogen atoms of hydroxyl groups present in cyclodextrin by acetyl groups is a method of acetylation in the presence of acetic anhydride or isopropyl acetate using a solvent capable of trapping an acid, such as pyridine. As a method for replacing hydrogen atoms of hydroxyl groups present in cyclodextrin by —CONHR (wherein R is methyl or ethyl), a wide variety of alkyl carbamate reactions can be used.

Macromolecular Composite Material

The proportions of the polymer component and the cyclodextrin compound in the macromolecular composite material of the present invention are not particularly limited, and can be any ratio. For example, the polymer component can be used as a main component of the macromolecular composite material.

Specifically, the proportion of the polymer component in the macromolecular composite material can be 50 mass % or more, based on the total mass of the polymer component and the cyclodextrin compound. In this case, the obtained macromolecular composite material can easily have the desired mechanical properties. The proportion of the polymer component is preferably 70 mass % or more, more preferably 80 mass % or more, and even more preferably 85 mass % or more, based on the total mass of the polymer component and the cyclodextrin compound. The proportion of the polymer component can be 99 mass % or less, preferably 98 mass % or less, even more preferably 97 mass % or less, and particularly preferably 96 mass % or less, based on the total mass of the polymer component and the cyclodextrin compound.

The macromolecular composite material of the present invention may contain components other than the polymer component and the cyclodextrin compound, as long as the effect of the present invention is not inhibited. Examples of additives include light stabilizers, antioxidants, preservatives, surfactants, fillers such as inorganic particles, flame retardants, pigments, colorants, fungicides, lubricants, and the like. The proportion of additives is also not particularly limited. It can be, for example, 20 parts by mass or less, preferably 15 parts by mass or less, more preferably 10 pars by mass or less, even more preferably 5 parts by mass or less, and particularly preferably 1 part by mass or less, per 100 parts by mass of the total mass of the polymer component and the cyclodextrin compound. The macromolecular composite material of the present invention may consist of only the polymer component and the cyclodextrin compound.

In the macromolecular composite material of the present invention, the mixed state of the polymer component and the cyclodextrin compound is not particularly limited. For example, the polymer component and the cyclodextrin compound can both be uniformly dispersed, or either can be partially unevenly distributed.

In particular, the macromolecular composite material of the present invention preferably has a sea-island structure. In this case, the macromolecular composite material can have further enhanced mechanical properties easily. The form of the sea-island structure is not particularly limited; and may be, for example, a form in which spherical islands are dispersed in a matrix (sea). When the islands are spherical, the average diameter is not particularly limited; it can be, for example, from 0.5 to 100 μm, preferably from 1 to 50 μm, and more preferably from 2 to 10 μm. The average diameter of the islands is the value obtained by randomly selecting five islands by direct observation of the macromolecular composite material using a scanning electron microscope, measuring the circular equivalent diameters of these islands, and then averaging them arithmetically.

Whether the sea-island structure is formed can be checked, for example, by various techniques known as methods for confirming the morphology of macromolecular materials. Specifically, images of the morphology can be obtained by observing the macromolecular composite material with a scanning microscope, and the formation of the sea-island structure can be confirmed by observing the sea portion and the island portion in the morphology.

When the macromolecular composite material has a sea-island structure, the sea portion is mainly composed of the polymer component. More specifically, the amount of the polymer component in the sea portion is preferably 80 mass or more, more preferably 90 mass or more, even more preferably 95 mass or more, and particularly preferably 99 mass or more. On the other hand, the island portion is a region in which the cyclodextrin compound can also be present in a large amount in addition to the polymer component.

In particular, in the sea-island structure, the interphase between the sea and island portions is strongly bonded by the molecular recognition ability of cyclodextrin. For example, when the polymer component contains a polystyrene resin, the interaction between the aromatic ring of the polystyrene and the cyclodextrin compound (e.g., host-guest interaction) comes into play, and this action can strongly bond the interphase between the sea and island portions. Since thermoplastic resins other than polystyrene resin can also interact with the cyclodextrin compound, the interphase between the sea and island portions can be strongly bonded in the same manner. As a result, interphase delamination between the sea and island portions is less likely to occur, and enhanced mechanical properties are provided. Although conventional polymer alloys or like composite materials also form a sea-island structure, interphase delamination is likely to occur in such conventional materials.

The macromolecular composite material is not particularly limited in shape, and can be formed into an appropriate shape according to, for example, the desired application. For example, the macromolecular composite material can be in the form of plates, films, sheets, blocks, powders, granules, pellets, fibers, pastes, and clays.

The method for producing the macromolecular composite material is not particularly limited; for example, a wide range of known methods can be used. For example, the macromolecular composite material can be produced by mixing a polymer component with a cyclodextrin compound. Among the production methods, a method using a solution or a dispersion containing a polymer component and a cyclodextrin compound is preferable, because a macromolecular composite material having a sea-island structure as described above is easily formed.

A wide variety of organic solvents can be used as the solvent in a solution or dispersion containing the polymer component and the cyclodextrin compound. Examples of organic solvents include chlorinated hydrocarbons such as chloroform and 1,2-dichloroethane; ether compounds such as diethyl ether and tetrahydrofuran; aliphatic hydrocarbons such as hexane and heptane; alicyclic hydrocarbons such as cyclohexane; aromatic hydrocarbons such as benzene, toluene, and xylene; ketone compounds such as acetone and methyl ethyl ketone; ester compounds such as vinyl acetate; alcohols such as methanol, ethanol, isopropyl alcohol, and t-butanol; formamides such as N,N-dimethylformamide and N,N-dimethylacetamide; pyrrolidones such as 2-pyrrolidone and N-methylpyrrolidone; dimethyl sulphoxide; and the like.

The method of forming a macromolecular composite material from a solution or dispersion containing the polymer component and the cyclodextrin compound is also not particularly limited. For example, a wide variety of film-forming methods, such as known casting methods and coating methods, can be used.

The macromolecular composite material of the present invention has excellent mechanical properties. Furthermore, since the cyclodextrin compound is highly biodegradable, the macromolecular composite material of the present invention easily decomposes through treatment, and is an environmentally friendly material.

EXAMPLES

The present invention is described below in more detail with reference to Production Examples and Examples. However, the scope of the invention is not limited to these Examples.

Example 1-1

Polystyrene (Mw=$1.7 \times 10^5$, Mw/Mn=2.24), which is a thermoplastic resin, was prepared as a polymer component. A compound in which hydrogen atoms of all hydroxyl groups of β-cyclodextrin were replaced with acetyl groups (hereinafter abbreviated as "AcβCD") was prepared as a cyclodextrin compound. AcβCD was produced by a known method. More specifically, AcβCD was produced by a method comprising reacting β-cyclodextrin and acetic anhydride in the presence of pyridine. Polystyrene (PS) and AcβCD were mixed at a mass ratio of PS to AcβCD (PS:AcβCD) of 99:1, thus obtaining a mixture. Toluene was added to this mixture to form a 5 mass % solution of the mixture. This solution was poured into a Teflon (registered trademark) mold, and air-dried at room temperature under atmospheric pressure to obtain a film. In order to remove residual toluene from the film, the film was heated and dried at 60° C. for 15 hours under reduced pressure, thus obtaining a film-like macromolecular composite material as a sample.

Example 1-2

A film-like macromolecular composite material was obtained as a sample in the same manner as in Example 1-1, except that the mixture was prepared by mixing polystyrene (PS) and AcβCD at a mass ratio of PS to AcβCD (PS:AcβCD) of 98:2.

Example 1-3

A film-like macromolecular composite material was obtained as a sample in the same manner as in Example 1-1, except that the mixture was prepared by mixing polystyrene (PS) and AcβCD at a mass ratio of PS to AcβCD (PS:AcβCD) of 97:3.

Example 1-4

A film-like macromolecular composite material was obtained as a sample in the same manner as in Example 1-1, except that the mixture was prepared by mixing polystyrene (PS) and AcβCD at a mass ratio of PS to AcβCD (PS:AcβCD) of 96:4.

Example 1-5

A film-like macromolecular composite material was obtained as a sample in the same manner as in Example 1-1, except that the mixture was prepared by mixing polystyrene (PS) and AcβCD at a mass ratio of PS to AcβCD (PS:AcβCD) of 95:5.

Example 1-6

A film-like macromolecular composite material was obtained as a sample in the same manner as in Example 1-1, except that the mixture was prepared by mixing polystyrene (PS) and AcβCD at a mass ratio of PS:AcβCD of 90:10.

Example 2-1

A film-like macromolecular composite material was obtained as a sample in the same manner as in Example 1-1, except that a compound in which hydrogen atoms of all hydroxyl groups of γ-cyclodextrin were replaced by acetyl groups (hereinafter referred to as "AcγCD") was prepared as a cyclodextrin compound in place of AcβCD, and polystyrene (PS) and AcγCD were mixed at a mass ratio of PS:AcγCD of 99:1. The AcγCD was produced by a known method, more specifically, by a method of reacting γ-cyclodextrin with acetic anhydride in the presence of pyridine.

Example 2-2

A film-like macromolecular composite material was obtained as a sample in the same manner as in Example 1-2, except that AcγCD was used in place of AcβCD.

Example 2-3

A film-like macromolecular composite material was obtained as a sample in the same manner as in Example 1-3, except that AcγCD was used in place of AcβCD.

Example 2-4

A film-like macromolecular composite material was obtained as a sample in the same manner as in Example 1-4, except that AcγCD was used in place of AcβCD.

Example 2-5

A film-like macromolecular composite material was obtained as a sample in the same manner as in Example 1-5, except that AcγCD was used in place of AcβCD.

Example 2-6

A film-like macromolecular composite material was obtained as a sample in the same manner as in Example 1-6, except that AcγCD was used in place of AcβCD.

Example 2-7

A film-like macromolecular composite material was obtained as a sample in the same manner as in Example 2-1, except that polystyrene (PS) and AcγCD were mixed to achieve a mass ratio of PS to AcγCD (PS:AcγCD) of 85:15.

Comparative Example 1-1

A film-like macromolecular composite material was obtained as a sample in the same manner as in Example 1-1, except that AcβCD was not used (that is, only PS was used as the polymer component).

Evaluation Method of Mechanical Properties

Mechanical properties were evaluated by a tensile test. As the tensile test, a tensile-load curve test was performed using an Autograph AGX-plus (produced by Shimadzu Corporation) at a tension rate of 0.1 mm/s at room temperature to observe the rupture point of each sample (thickness: 100 to 300 μm) (uniaxial elongation until rupture, with stress change being recorded). With this rupture point taken as the final point, the maximum stress applied until the final point was determined to be the rupture stress of the sample. This tensile test was performed with the bottom end of the macromolecular material being fixed, and the upper end being pulled at a tension rate of 0.1 mm/min (upward operation). The degree of stretching (which may be referred to as "strain percentage") was calculated by dividing the stroke (i.e., the maximum length of the pulled test piece) by the length of the test piece before being pulled. Further, the fracture energy ($MJ/m^3$) of the macromolecular material was calculated from the area of the obtained stress-strain curve.

Measurement of Molecular Weight (Mn, Mw)

The weight average molecular weight (Mw) was measured by gel permeation chromatography (GPC). "UV-8020" and "RI-8020" produced by Tosoh Corporation were used as the measuring instruments. The measured weight average molecular weights were expressed in terms of polystyrene (PS). First, a solution obtained by dissolving 10 mg of each sample in 1 mL of chloroform ($CHCl_3$) was filtered through a 0.45 μm nonaqueous chromatographic disk. The filtrate was analyzed under the following conditions to determine the weight average molecular weight in terms of PS.

Column: two "TSKgel GMHHRM-M" columns (trade name, produced by Tosoh Corporation) were used.
Column temperature: 40° C.
Carrier solvent: chloroform ($CHCl_3$)
Detector: RI (differential refractive index detector)
Standard polystyrene for calibration curve: "Standard Polystyrene Kit PStQuick," provided by Tosoh Corporation Evaluation Results FIG. 1(a) and FIG. 1(b) show the evaluation results of the mechanical properties of the samples obtained in the Examples and Comparative Example. Specifically, FIG. 1(a) shows the relationship between the proportion of polystyrene resin contained as a polymer component and fracture energy. FIG. 1(b) shows the relationship between the Young's modulus and fracture energy of the samples obtained in Examples 2-1 to 2-7. In the figures, the notation "PS/AcβCD" represents Examples 1-1 to 1-6, and the notation "PS/AcγCD" represents Examples 2-1 to 2-7.

FIG. 1(a) shows that the fracture energy of polystyrene alone (denoted as PS in FIG. 1(a), Comparative Example 1-1) was about 0.6 $MJ/m^3$, whereas all of the samples obtained in the Examples had a higher fracture energy than polystyrene alone (the maximum fracture energy in the samples of Examples 1 to 5 was about 2.3 MJ/ml. FIG. 1(b) shows an increase in Young's modulus with an increase in fracture energy.

The results thus show that the macromolecular composite material containing a polymer component and a cyclodextrin compound, such as the samples obtained in the Examples, has excellent mechanical properties, as compared with the polymer component alone. Such excellent mechanical properties of the macromolecular composite material are presumably attributable to the presence of host-guest interactions between the benzene ring of the polystyrene resin and cyclodextrin.

Figure 2:
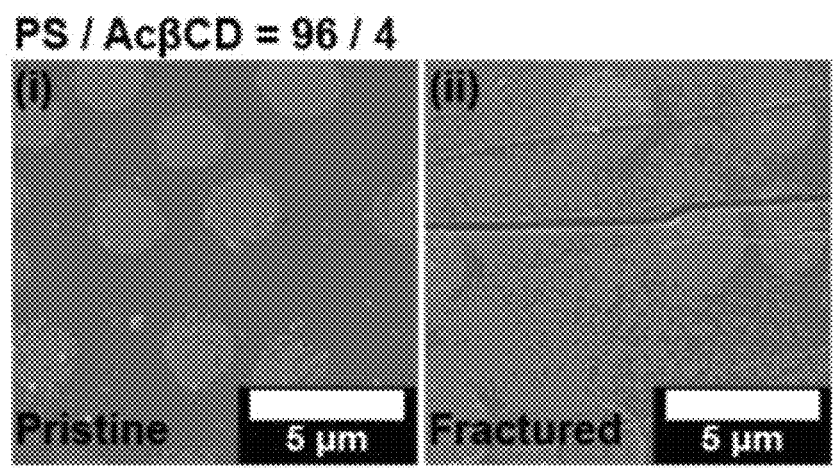
FIG. 2(a) and FIG. 2(b) are SEM images of samples before and after a tensile test.
Figure 2:
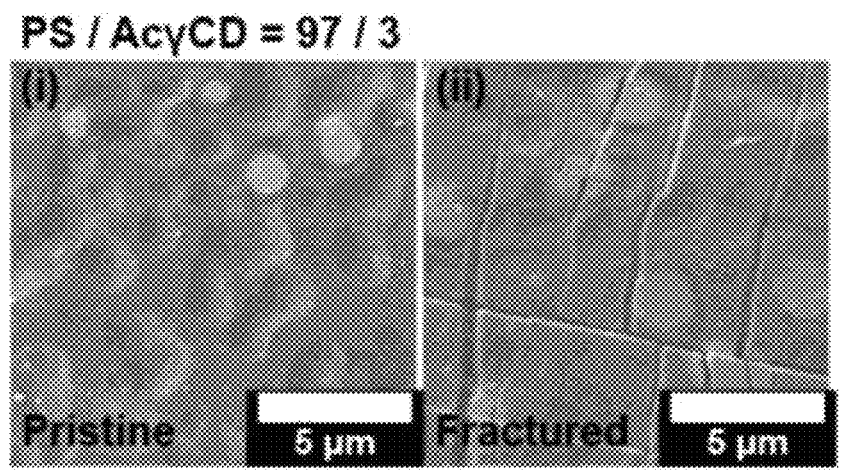

FIG. 2(a) and FIG. 2(b) show SEM images of the samples before and after the tensile test. Specifically, FIG. 2(a) shows SEM images of the sample obtained in Example 1-4 before and after the tensile test ((i) shows the image before the test; and (ii) shows the image after the test). FIG. 2(b) shows SEM images of the sample obtained in Example 2-3 before and after the tensile test ((i) shows then image before the test; and (ii) shows the image after the test).

The SEM images shown in FIG. 2(a) and FIG. 2(b) confirmed that the morphology of the macromolecular composite material containing the polymer component and the cyclodextrin compound formed a sea-island structure.

The invention claimed is:

1. A macromolecular composite material comprising a polymer component and a cyclodextrin compound,
    the polymer component containing a thermoplastic resin, and
    the cyclodextrin compound being at least one member selected from the group consisting of cyclodextrin and cyclodextrin derivatives,
    wherein the thermoplastic resin is at least one member selected from the group consisting of vinyl polymers and polyesters, and
    wherein the polyester is a polylactic acid.

2. A macromolecular composite material comprising a polymer component and a cyclodextrin compound,
    the polymer component containing a thermoplastic resin, and
    the cyclodextrin compound being at least one member selected from the group consisting of cyclodextrin and cyclodextrin derivatives,
    wherein the cyclodextrin derivative has a structure in which at least one hydrogen atom of hydroxyl groups of the cyclodextrin is replaced by at least one group selected from the group consisting of hydrocarbon groups, acyl groups, and —CONHR, wherein R is an alkyl group.

3. A macromolecular composite material comprising a polymer component and a cyclodextrin compound,
    the polymer component containing a thermoplastic resin, and
    the cyclodextrin compound being at least one member selected from the group consisting of cyclodextrin and cyclodextrin derivatives,
    wherein the macromolecular composite material has a sea-island structure.

4. The macromolecular composite material according to claim 1, wherein the proportion of the polymer component is 50 mass % or more, based on the total mass of the polymer component and the cyclodextrin compound.

5. The macromolecular composite material according to claim 2, wherein the proportion of the polymer component is 50 mass % or more, based on the total mass of the polymer component and the cyclodextrin compound.

6. The macromolecular composite material according to claim 3, wherein the proportion of the polymer component is 50 mass % or more, based on the total mass of the polymer component and the cyclodextrin compound.

7. The macromolecular composite material according to claim 2, wherein the thermoplastic resin is at least one member selected from the group consisting of vinyl polymers and polyesters.

8. The macromolecular composite material according to claim 7, wherein the vinyl polymer is at least one member selected from the group consisting of polystyrene resins and polyacrylic resins.

9. The macromolecular composite material according to claim 3, wherein the thermoplastic resin is at least one member selected from the group consisting of vinyl polymers and polyesters.

10. The macromolecular composite material according to claim 9, wherein the vinyl polymer is at least one member selected from the group consisting of polystyrene resins and polyacrylic resins.

* * * * *